United States Patent [19]

Hutchings

[11] 3,996,015
[45] Dec. 7, 1976

[54] CATALYTIC REACTOR WITH DIRT TRAP

[75] Inventor: Le Roi E. Hutchings, Mount Prospect, Ill.

[73] Assignee: UOP Inc., Des Plaines, Ill.

[22] Filed: Apr. 26, 1976

[21] Appl. No.: 680,267

Related U.S. Application Data

[63] Continuation-in-part of Ser. No. 533,113, Dec. 16, 1974, abandoned.

[52] U.S. Cl. .............................. 23/288 R; 55/307; 209/250; 210/73 R; 210/266; 210/304; 210/316; 210/317; 210/512 R
[51] Int. Cl.² .......................................... B01J 8/02
[58] Field of Search .......... 23/288 R; 55/204, 337; 209/250; 210/73 R, 266, 299, 304, 309, 316, 317, 318, 456, 512 R

[56] References Cited
UNITED STATES PATENTS

| 650,611 | 5/1900 | Reeves | 210/299 X |
|---|---|---|---|
| 2,905,633 | 9/1959 | Rosinski | 23/288 R |
| 3,100,141 | 8/1963 | Donovan | 23/288 R |
| 3,925,044 | 12/1975 | Tu et al. | 55/337 |

FOREIGN PATENTS OR APPLICATIONS

| 114,882 | 5/1929 | Germany | 23/288 R |
|---|---|---|---|
| 1,078,683 | 8/1967 | United Kingdom | 23/288 R |

*Primary Examiner*—Charles N. Hart
*Assistant Examiner*—Robert G. Mukai
*Attorney, Agent, or Firm*—James R. Hoatson, Jr.; Robert W. Erickson; William H. Page, II

[57] ABSTRACT

An apparatus for contacting a fluid stream with a bed of catalyst wherein solid particulate matter is removed from the fluid stream before contact with the catalyst bed. The fluid stream is tangentially discharged into a circular trough located in an upper section of a vertically disposed cylindrical vessel. The inner wall of the trough is porous to allow drainage of liquids, and vapors exit the trough through its open top. The vapors then pass downward through the open center of the trough and contact the catalyst bed located in the lower section of the vessel.

1 Claim, 2 Drawing Figures

CATALYTIC REACTOR WITH DIRT TRAP

RELATED APPLICATION

This is a continuation-in-part of my copending prior application filed Dec. 16, 1974, Ser. No. 533,113 entitled Contacting Vessel With Dirt Trap which is now abandoned.

FIELD OF THE INVENTION

The invention relates to an apparatus for contacting a fluid stream with a bed of particulates. Apparatus of this type are generally found in Class 23-288. The invention is more specifically related to a reactor design for the fixed bed catalytic hydroprocessing of petroleum fractions. The invention also relates to the purification of a gas stream, apparatus for which are found in Class 55.

PRIOR ART

Beds of solid particulate catalysts disposed within reaction zones have found commercial utility in many applications in the pharmaceutical, detergent, petroleum, insecticide, and heavy chemical industries. These catalysts are generally employed in processes for the treating or chemical conversion of various organic compounds, and are especially utilized within the petroleum industry for the treatment and conversion of various hydrocarbon mixtures and fractions.

Regardless of the reaction or purpose for which the catalyst is employed, it is essential for commercial acceptability that the particular catalyst bed exhibit a prolonged capability for performing its intended function, as well as exhibit a high degree of activity in effecting such function. However, after extended periods of use these catalysts usually become deactivated, thereby losing their capability to perform as desired. At such times operation of the process must be interrupted while the catalyst bed is reactivated or replaced. Such deactivation is seldom sudden, and it most often is a gradual decline in activity which results in the catalyst being no longer active to the necessary or desired degree. Advances in the art of catalysis have produced catalysts which are capable of adequate performance for extended periods of time. Processes using these catalysts are often forced to be shut down while the catalyst is still sufficiently active by the physical covering of the upper extremity of the catalyst bed by solid particles contained in the entering reactants. That is, the catalyst bed acts as a filter for these solid particles. A layer or crust of these particles therefore accumulates upon the catalyst bed and gradually restricts the flow of reactants into the bed. As the layer increases in depth with further accumulation of particles, the plant's production capacity is restricted. This is due to the incapacity of the hydrocarbon-feed pumping system to overcome the mounting restriction of the catalyst bed inlet. The result is a troublesome, premature stoppage of the operation of the plant for removal of the particle layer.

A method sometimes utilized for preventing such deposition of solid particles upon catalyst beds is to install elaborate and very expensive filtering devices upon the inlet conduit of the feed fluids pumping system. The disadvantages of this prior art solution to the problem are primarily the exorbitant cost of the filtering device itself and the increased cost of the associated hydrocarbon pumping system which is made necessary due to the inherently high pressure drop of the prior art devices.

The prior art has attempted to ameliorate this problem by spreading the incoming reactants over a larger surface area to thereby decrease the rate of pressure drop increase and its total magnitude after any specific period of usage. This is shown in U.S. Pat. Nos. 3,167,399; 3,598,539 (Cl. 23-288) and 3,888,633 (Cl. 23-284). Other apparatus having basket-type distributors inserted in the catalyst bed, or using dirt traps and rupture disks are also known in the art. These methods are shown in U.S. Pat. Nos. 3,006,740; 3,112,256; 3,255,159; 3,469,950; 3,607,000 (Cl. 23-1); and 3,702,238.

One of the more common configurations used in the separation of entrained particles from a fluid stream is a vertically oriented cylindrical vessel into which the fluid is injected in a direction which is tangential to the vertical inner surface of the vessel. This is similar to the cyclone separators commonly used to remove dust from gas streams. Tangential inlets are also used in vapor-liquid separators such as those presented in U.S. Pat. Nos. 1,838,507; 3,213,595 (Cl. 55-204) and 3,873,283 (Cl. 55-185).

Some apparatus used for the filtration of water utilize a trough-like structure to collect particles removed from the entering water stream. Examples are shown in U.S. Pat. Nos. 650,611 and 748,230. These apparatus are distinguishable from the present reactor design by both their divergent and unrelated field of art and by their mechanical dissimilarities. For instance, both of these references have two separate filters through which all of the entering liquid must pass. In contrast the subject invention utilizes an open top trough as a particle removal means. This construction allows the great majority of the entering gas stream to bypass the porous inner wall of the trough by traveling over the top edge of the inner wall and then descending through a central cylindrical void volume. The subject apparatus therefore lacks the primary filter of these references and functions in a different mode than the references. Furthermore, it is not desired that the catalyst in the bottom section of the subject apparatus act as a filter media such as shown in these two references. It is in fact, an objective of the invention to provide a reactor design which reduces the troublesome tendency of the catalyst to act as a filter.

BRIEF SUMMARY OF THE INVENTION

The invention provides a reactor with a dirt trap to prevent the plugging of a catalyst bed used in catalytic processes which charge fluids containing solid particles. A feed stream is introduced tangentially into a horizontal circular trough located in an upper part of the interior of a vertically-oriented cylindrical contacting vessel. Rotary motion and contact with the vessel wall cause entrained solid particles to settle to the bottom of the trough while the gases in the feed stream escape through the open top of the trough. The gases then descend to a catalyst bed through a tubular conduit formed by the porous inner wall of the trough.

BRIEF DESCRIPTION OF THE DRAWINGS

The attached drawings illustrate the preferred embodiment of the present invention. Only such details are included as are necessary for a clear understanding of my invention, and it is not intended to limit the scope of the invention to the exact structure shown. Certain items necessary to the operation of this invention but unnecessary to its understanding, such as certain details of the means used to support various elements of the apparatus have been omitted for the sake of clarity. It is understood that various modifications will be apparent to those skilled in the art.

Referring now to FIG. 1, vessel 1 is shown as having a cylindrical internal volume enclosed by an outer wall. Incoming fluids and entrained solid particles enter the vessel through a fluid inlet means 2 which is aligned tangentially with the outer wall of the vessel. Solid particulates in the incoming stream come to rest upon a disk-shaped plate 3 and are retained by a vertical porous inner wall 4. The majority of the gaseous components of the incoming stream, having been divested of entrained particulate matter, pass over the top of wall 4 and proceed downward through the cylindrical conduit formed by wall 4. Any liquid in the incoming stream may pass horizontally through the wall 4. The reactants then pass through a catalyst bed 6 and exit the reactor through an opening 8.

Referring now to FIG. 2, the trough formed by plate 3 and the porous cylindrical conduit comprising wall 4 is clearly shown. Solid particulate matter entering the vessel 1 through inlet 2 is retained in the trough and is shown as accumulated dirt 5. After deposition of entrained particulate matter, the dirt-free fluids proceed through and over wall 4 and pass through catalyst bed 6. The fluids, after contact with the catalyst bed, then pass through porous support 7 and exit vessel 1 in outlet 8.

DETAILED DESCRIPTION OF THE INVENTION

Figure 1:
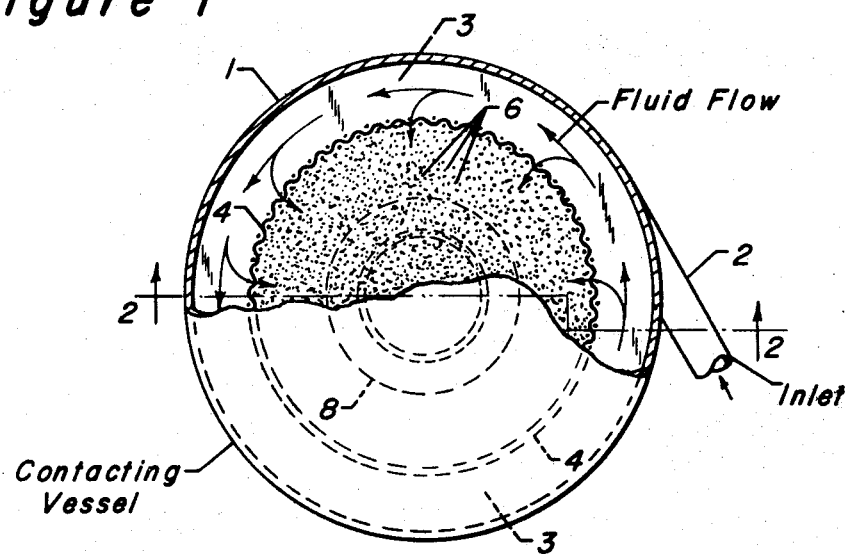
FIG. 1 is a horizontal sectional view looking down at the reactor.
Figure 2:
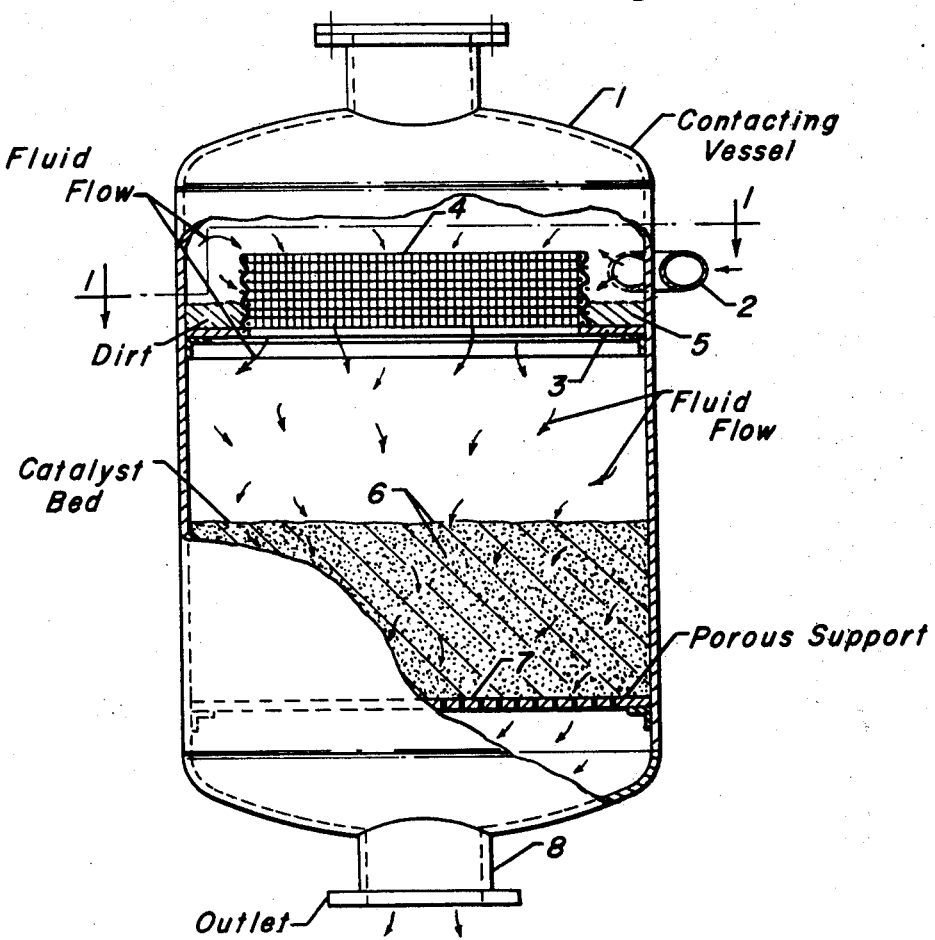
FIG. 2 is a sectional elevation view, taken along line 2—2 as shown in FIG. 1, showing catalyst bed 6 and outlet 8. Line 1—1 indicates the section shown in FIG. 1.

Numerous commercial processes involve contacting fluid hydrocarbon oils and other materials with a bed of solid catalyst particles for the purpose of physical or chemical treatment of the fluid materials. In many of these processes, as for example, the hydrotreating and hydrocracking of oils, the partially or totally vaporized feedstock oil carries suspended solid-particulate matter, such as finely divided oxides of iron, pipe scale, shale particles, tar sands particles, dirt, catalyst particles from upsteam processes, etc. Heavier oils, by virtue of their higher viscosities, are capable of retaining even larger particles in suspension than are the lighter oils. The heavier oils therefore cause the most severe catalyst bed plugging problems experienced by oil refiners.

The small spaces between catalyst particles provide the paths by which the reactants pass through a catalyst bed within a contactor. Solid particles entering with the incoming fluid and which are too large to pass through these spaces are caught within the catalyst bed and gradually accumulate, closing the flow paths. The result is a gradual increase in the pressure drop measured across the catalyst bed. This eventually forces a reduction in the process' production rate or a cessation of the process for cleaning of the catalyst bed. This is particularly vexing when it occurs before the chemical activity of a catalyst bed has been diminished sufficiently to warrant catalyst replacement. I have found that by use of the novel contactor of my invention suspended solid matter can be removed from the oils as they enter the contactor and before passing through the catalyst bed, thereby postponing or eliminating the costly stoppage of the operation to rectify a plugged catalyst bed.

My invention, in its essence, provides a contactor having a dirt trap to retain solid particles which would not pass through a catalyst bed and also having a low pressure drop and long service life. Low pressure drop and long service life are achieved by the provision of large cross-sectional area for fluid flow and a large capacity for trapped dirt. Large cross-sectional area provides little restriction to flow, and, therefore, low pressure drop. The extended time required to fill a large dirt trap provides long service life.

The contactor of my invention utilizes the principles of impingement separating and cyclone separating to remove dirt entrained in moving fluid masses. It is well known in the art that when a dust-laden fluid impinges upon a solid body the dust will tend to collect upon the body, whereas the fluid will find a devious path around or along the body. Cyclone separation involves the use of acceleration of a dust particle in a direction essentially normal to the direction of motion of the particle. This is effected by tangential entry of a dust-laden fluid into a cylindrical chamber. The inertia of the dust particle causes it to move to the chamber wall where its kinetic energy is dissipated through impingement upon the chamber wall. I have devised a unique contactor, using these principles, which provides a dust trap for removing particulate matter from fluids before their contact with a granular solids bed.

The apparatus of my invention is housed in a vertically oriented cylindrical vessel which contains a bed of solid particulate catalyst supported above an outlet at the bottom of the vessel. This catalyst may be any of the many substances which are used for the catalytic treatment of vaporized hydrocarbons including catalysts for hydrodesulfurization, hydrogenation, dehydrogenation, hydrocracking, reforming, alkylation, polymerization, etheration, isomerization, etc. The apparatus may also be used as a contactor other than a reactor and would then contain adsorbents such as zeolites or filtrants such as sand, and the like. The bed of solid particulates is supported upon a porous support. Support of particulate beds is not new in the art, and any of the commonly known methods of support will suffice. Preferably this support comprises a fine mesh screen which has openings sufficiently small to retain the bed particles and a metal grid or perforated plate of sufficient supportive strength and which is located below the screen and is fastened to the vessel's interior wall. The outer vessel itself and its many accouterments are constructed in a conventional manner well known to those skilled in the art.

The essence of my invention, a novel and efficient dirt trap, is situated within an upper section of the vessel. As used herein the term upper section is intended to refer to the upper one-half of the vessel, and the lower section is intended to indicate the bottom half. The upper section of the vessel has a tangential inlet through which fluid, such as a dust-laden vapor or gas or a two-phase liquid-vapor mixture containing particulate matter and vaporized hydrocarbons may gain entrance to the contactor. I prefer to use as the fluid inlet means a conduit which communicates with the vessel by tangential intersection of the vessel wall in the manner illustrated in the drawing. The conduit should not extend into the vessel, but should terminate at points of intersection with the vessel wall. Other inlet means configurations, such as those shown in the previously cited references, may however be utilized. For instance, the inlet means may comprise an extension of the conduit into the vessel, and the conduit may be curved to conform to the inner surface of the vessel. Various caps or guides have also been shown in the references as a means of imparting tangential fluid flow. Perhaps the simplest construction is the use of an L-shaped pipe fitting attached to the wall of the vessel. It should be noted that the preferred arrangement provides very intimate contact of the entering vapors with the wall of the vessel. Those means shown in the prior art which dishcarge the incoming stream in two opposite directions are to be avoided.

A horizontally-disposed circular trough is situated along the vessel wall below and adjacent the inlet for catching and retaining particulate matter which enters the vessel in the incoming fluid. Preferably, the fluid inlet means discharges the incoming stream at an elevation intermediate the top and bottom of the trough. It may however be at the same level or slightly above the upper edge of the porous conduit forming the inner wall of the trough. Discharging the fluid stream at the bottom of the trough is undesirable as it will tend to agitate previously settled particles. In the preferred embodiment of my invention this trough is of greater cross-sectional area than the transfer line carrying the incoming stream to the fluid inlet means. With the preferred discharge of the fluids into the trough, the trough has a cross-sectional area of about two to about five times that of this inlet transfer line. This increased area is desirable to provide conditions conductive to the settling of the particulate matter. Since the fluid inlet means may be located above the trough, the trough must be open at the top to allow particulate matter to fall therein. This also provides a low resistance flow path out of the trough when vapors are charged directly into it.

Dust particles entering the vessel through the inlet means are accelerated circumferentially by their contact with the vessel wall. Contact with the vessel wall also dissipates the kinetic energy of the particles, and they then respond to gravitational forces by falling into the open trough below. The form of the trough's cross-section is not important, however I prefer to use a trough of substatially rectangular cross-section for ease of construction and simplicity of periodic cleaning. That is, the trough will preferably have a flat horizontal bottom and a vertical inner side. The outer side wall of the trough is preferably the cylindrical vessel wall but a separate and distinct cylindrical wall may be utilized to form a unitary trough structure.

It is preferable that the inner wall of the trough be porous and that its pores be small enough to retain the particulate matter which enters the vessel in the incoming fluids. A woven steel screen of the required mesh may be used to good advantage as the trough's inner side wall. The porosity of the trough's inner side wall allows any liquid entering the trough to escape and contact the solid bed, while wetted particulate matter is retained within the trough. Failure to provide this porous inner surface would tend to cause the retention of liquid and undesired polymerization or coking of the liquid. Any large amount of liquid which enters with the mixed phase operation or during a plant upset must be allowed to drain, or the accumulated liquid may carry previously settled particles as it spills over the upper edge of the trough and onto the catalyst. Finally, a porous inner wall allows any liquid used during catalyst washing operations or startups, such as liquid-phase sulfiding, or shut downs to leave the reactor. This is especially important if the catalyst is to be regenerated through the removal of carbon deposits by oxidation.

The preferred structure of the inner wall forms a porous conduit which is concentric with the vertical axis of the vessel and which provides an unobstructed central passageway extending from above to below the trough. The majority of the vapors in the incoming stream may thus exit the trough through its open top and then descend the porous conduit to the catalyst bed below. Other forms of porosity may also be utilized such as small perforations in a solid inner side wall fabricated from a steel plate or a wound wire grating. The ratio of the radius of the porous conduit to the width of the bottom of a rectangular trough may range from about 2.5:1 to about 10:1 and is preferably within the range of about 3.5:1 to about 6.0:1.

In accordance with the preceding description the preferred embodiment of the invention may be characterized as a hydrocarbon conversion reactor for use with a feed stream which comprises vaporized hydrocarbons and entrained particulate matter, which reactor comprises a vertically oriented vessel having an internal volume located within a cylindrical interior side wall and having upper and lower sections; a porous horizontal support disposed within the lower section of the vessel; a bed of catalyst situated upon the porous horizontal support; a fluid outlet means communicating with the internal volume of the vessel at a point below the porous horizontal support; a horizontally situated actinomorphic trough which is open at the top and located in the upper section of the vessel, the trough having a bottom surface formed by a horizontal impervious disk-shaped plate and also having two parallel side walls formed by an impervious outer vertical wall comprising a portion of the cylindrical interior side wall of the vessel and a porous vertical cylindrical conduit located in spaced relationship from the impervious outer vertical wall, the porous vertical cylindrical conduit terminating at horizontal circular upper and lower edges and surrounding a centrally located cylindrical fluid passageway which extends through the trough; and a fluid inlet means in communication with the internal volume of the vessel through an opening in the impervious outer vertical wall of the trough and having an outlet which is aligned tangentially with the cylindrical interior side wall of the vessel.

I claim as my invention:

1. A hydrocarbon conversion reactor for use with a feed stream which comprises vaporized hydrocarbons and entrained particulate matter which comprises:
   a. a vertically oriented vessel having an internal volume located within a cylindrical interior side wall and having upper and lower sections;
   b. a porous horizontal support disposed within the lower section of the vessel;
   c. a bed of catalyst situated upon the porous horizontal support;
   d. a fluid outlet means communicating with the internal volume of the vessel at a point below the porous horizontal support;
   e. a horizontally situated actinomorphic trough which is open at the top and located in the upper section of the vessel, the trough having a bottom surface formed by a horizontal impervious disk-shaped plate and also having two parallel side walls formed by an impervious outer vertical wall comprising a portion of the cylindrical interior side wall of the vessel and a porous vertical cylindrical conduit located in spaced relationship from the impervious outer vertical wall, the porous vertical cylindrical conduit terminating at horizontal circular upper and lower edges and surrounding a centrally located cylindrical fluid passageway which extends through the trough; and, d. a fluid inlet means in communication with the internal volume of the vessel through an opening in the impervious outer vertical wall of the trough and having an outlet which is aligned tangentially with the cylindrical interior side wall of the vessel, whereby the feed stream enters the vessel at a point within the trough and is discharged into the trough tangentially to the cylindrical interior side wall of the vessel, at least a portion of the particulate matter entrained in the feed stream is collected in the trough, any liquid in the feed stream may pass through the wall of the trough formed by the porous vertical cylindrical conduit and descend to the bed of catalyst, and the majority of vaporized hydrocarbons in the feed stream will leave the trough through the trough's open top and then descend unfiltered through the porous vertical cylindrical conduit to the bed of catalyst.

* * * * *